Sept. 26, 1950  J. T. POTTER  2,523,516
ELECTRONIC TOTALIZER

Filed June 14, 1947  6 Sheets-Sheet 1

*INVENTOR.*
JOHN T. POTTER
BY *Alfred W. Barber*
*ATTORNEY*

Sept. 26, 1950  J. T. POTTER  2,523,516
ELECTRONIC TOTALIZER
Filed June 14, 1947  6 Sheets-Sheet 3

FIG.4.

INVENTOR.
JOHN T. POTTER
BY Alfred W. Barber
ATTORNEY

INVENTOR.
JOHN T. POTTER
BY Alfred W. Barber
ATTORNEY

Patented Sept. 26, 1950

2,523,516

UNITED STATES PATENT OFFICE 2,523,516

ELECTRONIC TOTALIZER

John T. Potter, New York, N. Y.

Application June 14, 1947, Serial No. 754,635

5 Claims. (Cl. 235—92)

The present invention concerns electronic machines for integrating and, in particular, devices and machines for totalizing or integrating certain types of functions.

There are many devices available capable of totalizing or integrating. The planimeter is an example of a mechanical integrator. No matter how precisely it may be constructed it cannot give an absolutely accurate reading. An adding machine is an example of a totalizer capable of adding in absolute terms a large number of different values. It, however, can add only one quantity to the total of any given instant. Some integrators, such as watt-hour meter, are capable of adding a large number of quantities simultaneously but here again the result is not in absolute terms.

The present invention concerns totalizers or integrators in which at least some of the functions are performed by electronic means and which, when applied to certain types of problems, give absolute answers. The devices and machines of the present invention are capable of totalizing a large number of unit quantities, objects, or occurrences up to the acceptance rate per unit time of the machine whether discrete or simultaneous. Quantities having a number of predetermined values may also be totalized or integrated. Since some or all of the functions of the machines may be electronic, rates of count of over one million a second may be attained.

The generalized system of the present invention includes four major electronic devices. Various numbers of the individual devices combined in a wide variety of ways are capable of solving many problems. Other problems may be solved by combinations of one or more of one, two, or three of the essential devices. The four essential devices are as follows:

1. Electronic counters.
2. Electronic pulse generators.
3. Electronic scanners.
4. Electronic time delay, lock out and resets.

The totalizing or integrating systems which may be set up of various combinations of these major units are all characterized by high speed counting capabilities, flexibility, and results in absolute numbers.

Three types of counting may be performed by machines described in two copending patent applications of John T. Potter one entitled "Counters," filed November 13, 1943, and bearing Serial Number 510,229 and the other entitled "Predetermined Electronic Counter," filed March 27, 1946, and bearing Serial Number 657,581. The first of the above mentioned cases discloses a binary counter in which each unit comprising four stages counts to sixteen. This case also discloses counting by tens or other factors by reading out part of the sixteen count. By reading six out of each unit a multiple unit decade counter conforming to the decimal system of counting is shown. In the predetermined counter disclosed in the second of the above mentioned applications a counter capable of counting to some predetermined number, say 1000, is preset to read out some number, say 800, and will then count to the difference between 800 and 1000 or 200 and repeat, give a signal at each repeat point or perform other functions. Any one of these three types of counters may be utilized in the novel combinations of the present invention.

The second major device which is used in some of the combinations of the present invention is the electronic pulse generator. The function of the pulse generator is to provide a predetermined number of output pulses for each input pulse received. In this way single pulses from various sources may be weighted. It may be required, for instance, to give pulses from one source a relative value of two, from another five and another ten. In order to totalize the weighted values from these sources the pulses from the first source are applied to a pulse generator sending out two pulses for each one received, from the second to a five pulse generator and from the third to a ten pulse generator. The total count is a count of the sum of the output pulses from all the pulse generators. The combination of a counter and a number of pulse generators will give a total count of various weighted operations and is particularly applicable where the operations of various sources are not simultaneous. This combination may also be used for limited simultaneous operations or occurrences if some form of lock-out may be employed so that one operation prevents another during a counting interval.

Where simultaneous operations or occurrences are to be counted the electronic scanner may be employed. This is a device which searches the devices the operations of which are to be counted and sends out a pulse when a given operation or occurrence is detected. A scanner stage is provided for each device to be monitored and the stages are successively energized. When an operation has taken place in a given device between the energizing cycles, the scanner stage detects it and passes a pulse to a counter. A large number of devices can be monitored in this way and a large number of simultaneous operations counted. This combination is particularly applicable where a simple lock-out may be employed to prevent occurrences to be counted from taking place during the scanning cycle.

The electronic time delay and reset is a device which may be used to provide a waiting interval in a sequence of operations, for resetting lock-outs and other devices and for initiating a scanning cycle. Its primary application is in conjunction with a scanner counting simultaneous operations with lock-out provisions. At the end of the scanning cycle a pulse is fed to this device. This pulse is held in a time delay circuit while the lock-out devices are released to permit further operations or occurrences and such other operations as may be required in a particular system to take place. When the system is in condition for another scanning cycle this device may operate the lock-out devices and it then starts the scanning cycle by sending an initiating pulse to the scanner.

Figure 1:
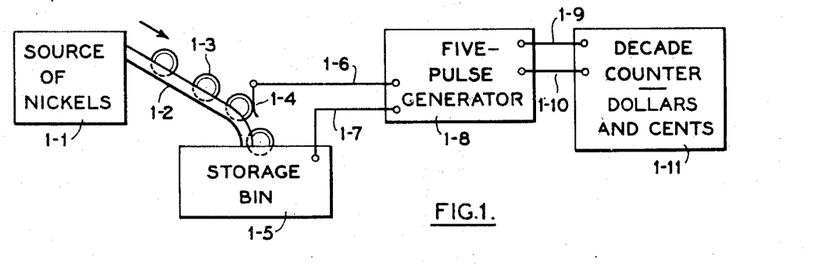

Fig. 1 shows the combination of a five pulse generator and a decade counter. A source of objects to be evaluated may be, for example, the "Source of Nickels" 1—1. This source may be any source of nickels as, for instance, a minting machine or a subway turnstile. The nickels 1—3 are ejected from the source down a chute 1—2 to a "Storage Bin" 1—5. At some point in their passage from the source to the bin a device is provided for detecting the passage of each nickel as, for instance, contactor 1—4. Thus at the passage of each nickel down the chute a circuit is closed between common lead 1—7 and contactor lead 1—6 and these leads are connected to the input of a pulse generator representing unit value or unit weight such as "Five-Pulse Generator" 1—8. This pulse generator, which will be shown and described in detail below, generates five pulses each time contact 1—4 detects the passage of a nickel. These five pulses will then represent the value in cents of the nickels passing down chute 1—2. The pulses from generator 1—8 are applied to "Decade Counter" 1—11 which counts and indicates the total of all pulses received as described in the above mentioned patent application. The total count or indication on counter 1—11 will be the dollars and cents value of all the nickels which have entered storage bin 1—5. Obviously source 1—1 may be a source of any objects to be evaluated and pulse generator 1—8 may generate any desired number of pulses to represent the value or weight of each object. Counter 1—11 will show the total value, weight, etc., of all objects issued by the source and passed to the storage bin. This is an example of a system for integrating or totalizing a large number of objects in which each object is given a weighted value so that the total indicated has significance without computation. The significance of this procedure becomes particularly apparent in a system embodying several units for counting objects of different denominations.

Figure 2:
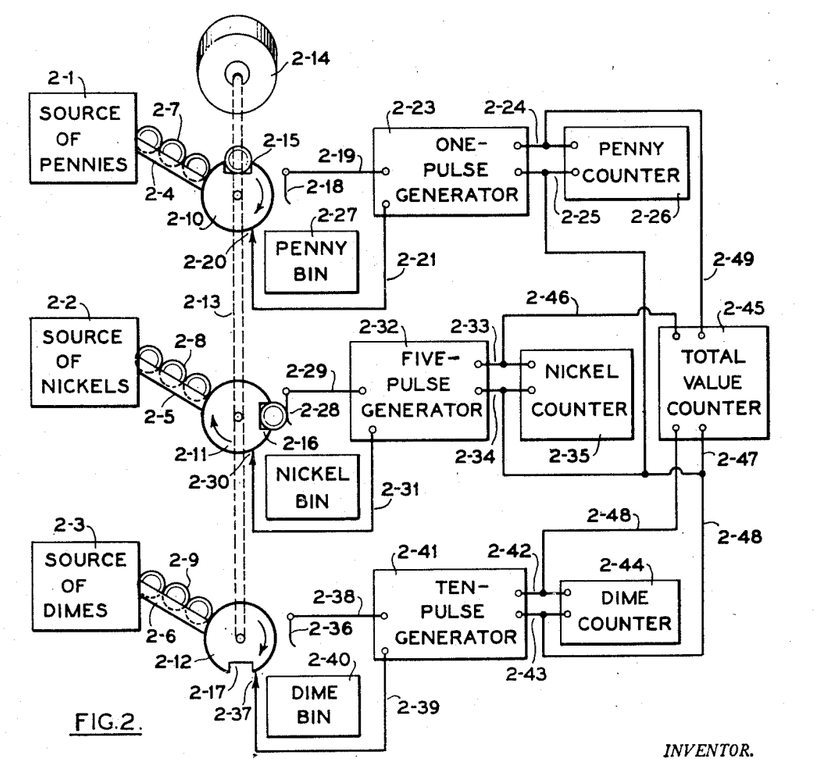

Fig. 2 shows the combination of several pulse generators of different denominations and several counters for indicating partial and grand totals. High speed simultaneous counting is made possible by the use of a plurality of synchronized and dephased mechanical gates. Three sources of objects to be given different weighted values are shown as "Source of Pennies" 2—1, "Source of Nickels" 2—2 and "Source of Dimes" 2—3. Pennies 2—7 from source 2—1 travel down a chute 2—4 to a mechanical gate consisting of a slot 2—15 in rotating disk 2—10. This disk 2—10 is rotated at any suitable speed by motor 2—14 through shaft 2—13. As disk 2—10 rotates it picks up a penny from chute 2—4 if a penny has come down since the previous revolution. Disk 2—10 carries the penny around and past a detector such as contact 2—18. If slot 2—15 carries a penny a circuit is closed between detector contact 2—18 and common contact 2—20 thereby shorting the input to "One-Pulse Generator" 2—23 over leads 2—19 and 2—21. Shorting the input to pulse generator 2—23 causes it to generate one pulse representing the weighted value of the penny. This single pulse is passed to "Penny Counter" 2—26 over leads 2—24 and 2—25 where it registers one count. Thus the penny counter 2—26 adds and indicates the dollars and cents value of all pennies issued from Source 2—1. After the pennies pass the detector contact 2—18 they are dropped in a convenient collecting means such as "Penny Bin" 2—27.

In a similar manner the weighted value of objects from a second source such as "Source of Nickels" 2—2 is totalized. Nickels 2—8 from Source 2—2 pass down a chute 2—5 to slot 2—16 in the second disk 2—11. This second disk 2—11 is rotated in synchronism and dephased with respect to disk 2—10 in any convenient manner as by turning from the same shaft 2—13 but with slot 2—16 turned 90 degrees with respect to slot 2—15. The nickels carried by slot 2—16 pass detector contact 2—28 and in cooperation with common contact 2—30 close the circuit over wires 2—29 and 2—31 to the input to "Five-Pulse Generator" 2—32. Each time this circuit is closed at the passage of a nickel five pulses are generated representing the weighted value of the nickel and these five pulses are passed to the "Nickel Counter" 2—35 over leads 2—33 and 2—34. This counter adds each count received and therefore shows a total in dollars and cents of all nickels issued from source 2—2.

A third source of objects to be counted is shown in the "Source of Dimes" 2—3. Dimes 2—9 from source 2—3 pass along chute 2—6 to disk 2—12. Disk 2—12 has a slot 2—17 advanced by 90 degrees from slot 2—16 and it also turns in synchronism with disks 2—10 and 2—11 by being mounted on the common shaft 2—13. The dimes are counted by contacts 2—36 and 2—37 closing circuit wires 2—38 and 2—39 to "Ten-Pulse Generator" 2—41. Pulse generator 2—41 generates ten pulses for each dime passing contact 2—36, which pulses are passed to "Dime Counter" 2—44 over leads 2—42 and 2—43. Thus the dime counter 2—44 adds and shows the total dollars and cents value of all dimes issued from source 2—3.

In addition to the individual counters 2—26, 2—35 and 2—44 a grand total totalizer consisting of "Total Value Counter" 2—45 is employed. The outputs from pulse generators 2—23, 2—32 and 2—41 are fed to counter 2—45 over common lead 2—47 and non-common leads 2—49, 2—46 and 2—48 respectively. This total counter counts the sum of all the pulses representing the pennies, nickels and dimes and shows a grand total value of all in dollars and cents. It will be seen that, by the use of the synchronous but dephased mechanism at the point where the coins of the various denominations are detected, the sources themselves may issue coins simultaneously and that the true and weighted count will be maintained.

Thus Fig. 2 shows a form of the invention in which the issue from several sources of different denominations is added for totals of each denomination and a total for all denominations. The combination includes counters, pulse generators and synchronous dephased detecting means. Obviously a wide range of objects of different values, weights, etc., may be totalized in this manner.

Figure 3:
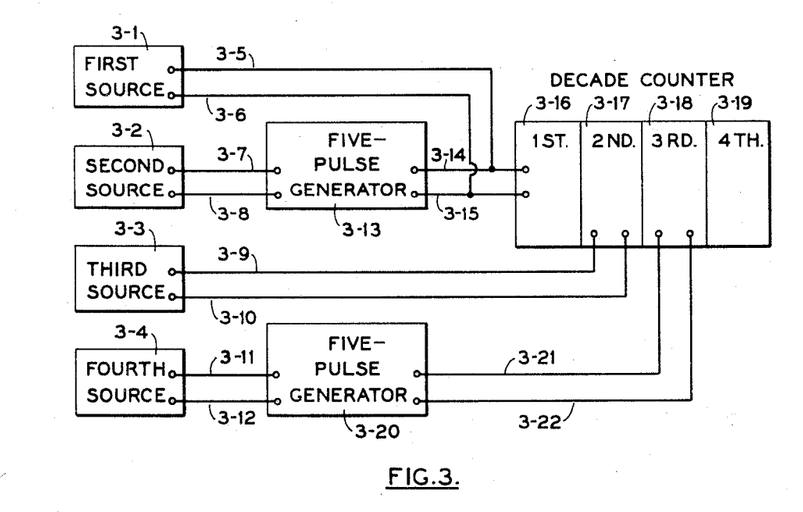

Fig. 3 shows a modified form of totalizer in which some of the pulse generators are eliminated by a modified connection to the decade counter. Four sources of different denominations are shown. The "First Source" 3—1 issues objects to be given a value of one. The blocks 3—1, 3—2, 3—3 and 3—4 represent the sources of the objects to be totalized or integrated including suitable detector devices which initiate suitable actuating signals over leads 3—5, 3—6, 3—7, 3—8, 3—9, 3—10, 3—11 and 3—12 wherein each signal indicates one object. Leads 3—5 and 3—6 from the first source 3—1 are connected to the first decade 3—16 of the "Decade Counter" so that each object issued by source 3—1 adds one to the total count. The "Second Source" 3—2 issues objects with a relative value or weight of five and the detector leads 3—7 and 3—8 are connected to the input of "Five Plus Generator" 3—13 so that five pulses are generated for each object issued. The output of generator 3—13 is connected to first decade 3—16 by means of leads 3—14 and 3—15 so that each object issued by source 3—2 adds five to the total count. The "Third Source" 3—3 issues objects having relative weight or value of ten each. The output of the third source detector is applied by means of leads 3—9 and 3—10 to the second decade 3—17 of the Decade Counter, since at this point each signal or pulse adds ten to the total. This connection eliminates the need for a pulse generator. The "Fourth Source" 3—4 issues objects having a relative value or weight of five hundred each. The detector output from Source 3—4 is applied over leads 3—11 and 3—12 to "Five Pulse Generator" 3—20 which generates five pulses for each object issued by source 3—4. The output pulses from generator 3—20 are applied to the input to the third decade 3—18 of the Decade Counter by means of leads 3—21 and 3—22. At this point each pulse adds one hundred to the total count and since five pulses are generated for each object issued by source 3—4 a count of five hundred is added to the total count for each object issued by 3—4. Thus by applying the signals representing objects issued to various points of the decade counter and by using pulse generators at other points a wide range of values may be counted in a simple manner.

Figure 4:
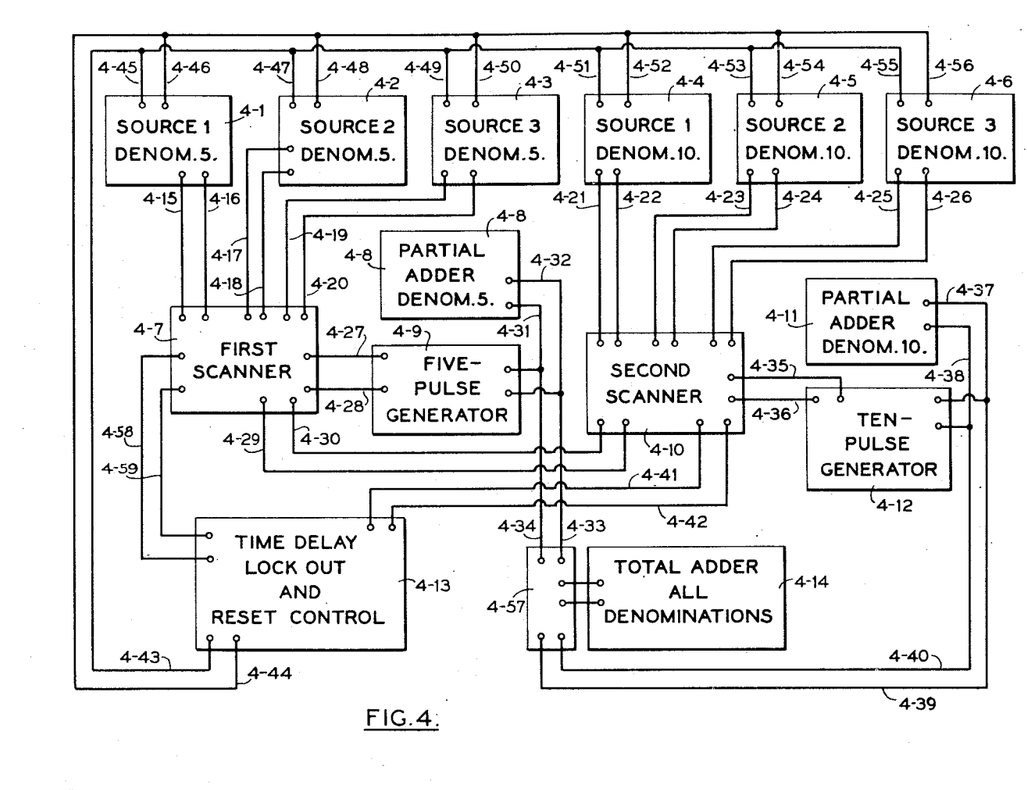

Fig. 4 shows, in block diagram, a complete system according to the present invention involving several sources of each of two denominations, scanners, pulse generators for two denominations, partial adders for the two denominations, a total adder and a time delay, lock-out and reset control unit. This is a non-synchronized system in which operation of any of the sources may be accomplished during the time delay interval. During the very brief scanning interval the sources are locked out. At the end of each scanning cycle the reset control resets each source so that it may be operated again. The particular combination shown is for purposes of illustration since it will be evident that the invention is in no way limited to a specific number of component units or particular arrangement.

Fig. 4 shows source 1 of the denomination 5 at 4—1, source 2 of denomination 5 at 4—2, source 3 of denomination 5 at 4—3, source 1 of denomination 10 at 4—4, source 2 of denomination 10 at 4—5 and source 3 of denomination 10 at 4—6. The operations of all three sources of denomination 5 are to be added in one partial adder and hence first scanner 4—7 is provided for these sources. Sources 1 through 3 of denomination 5 are connected to first scanner 4—7 by means of leads 4—15 through 4—20. Since the denomination is 5, a five-pulse generator 4—9 is connected to scanner 4—7 by means of leads 4—27 and 4—28. The output pulses from pulse generator 4—9 are applied to partial adder for the 5 denomination 4—8 by means of leads 4—31 and 4—32. Since the grand total is to be found, the output of pulse generator 4—9 is also fed to total adder for all denominations 4—14 over leads 4—33 and 4—34 through buffer 4—57. In a similar manner the three sources 4—4, 4—5 and 4—6 of denomination 10 are provided. For these sources of denomination 10 the second scanner 4—10 is provided connected to the sources by leads 4—21 through 4—26. Since the denomination is 10, a ten-pulse generator 4—12 is provided connected to scanner 4—10 by means of leads 4—35 and 4—36. The output of pulse generator 4—12 is fed to the partial adder for denomination 10 at 4—11 over leads 4—37 and 4—38. In order to show the operations from the sources of denomination 10 on the total adder 4—14 the output of pulse generator 4—12 is also connected to total adder 4—14 by means of leads 4—39 and 4—40 through buffer 4—57.

At this point the partial operation of the equipment may be followed. The various "Sources" may be taken to represent any devices the operations of which are to be totalized. The denominations represent the relative weighted value to be assigned to each source. For instance, source 1 of denomination 5 may represent a coin machine receiving nickels, an automatic screw machine turning out parts containing 5 ounces of copper, a machine turning out parts used in a total assembly where the relative number of these parts is 5, or any operation of making, counting, sorting, etc., requiring a relative weighted count of 5 toward the grand total. It is assumed that at the start of each scanning cycle the operations to be counted have been completed and each source is in condition for the count. Assuming that operations have taken place in source 1 and 3 of denomination 5 and source 2 of denomination 10 prior to the start of the scanning cycle to be described. The first scanner starts its scanning cycle and scans in order sources 1, 2 and 3 of denomination 5. Since source 1 has been operated it detects this operation which passes a pulse to pulse generator 4—9. Pulse generator 4—9 generates 5 pulses indicating one operation of a source of denomination 5 and these 5 pulses are counted by both partial adder 4—8 and total adder 4—14 adding 5 to the totals shown by these adders. First scanner 4—7 continues the scanning operation and finding source 2 in non-operated condition passes over it without generating a pulse. At source 3 another pulse is generated due to its operated condition and 5 pulses are added to the totals. First scanner 4—7 having scanned its associated sources passes the scanning pulse to second scanner 4—10 over leads 4—29 and 4—30. This initiates a scanning cycle in scanner 4—10 which scans sources 4—4, 4—5 and 4—6 in turn. Since source 4—4 is in non-operated condition the scanning pulse passes to source 4—5. Source 4—5 has been assumed to be in operated condition and hence a pulse indicating this fact is passed to pulse generator 4—12 thereby initiating 10 pulses which are added to the totals of adders 4—11 and 4—14. The scanning of scanner 4—10 continues to source 4—6 which being in non-operated condition causes the pulse to pass to the Scanner output. The scanning cycle has now been described from the start of a scanning pulse in the first scanner until it arrives at the output of the second scanner. During the scanning cycle two of the 5 denomination sources were found to have been operated and the resulting action in the pulse generator and adders was to add a count of 10 to the count of the partial adder for denomination 5 and 10 to the count of the total adder for all denominations. Also during this scanning cycle one of the 10 denomination sources was found to have been operated and this resulted in adding 10 to the count of the denomination 10 adder and 10 to the total adder. Thus in the complete scanning cycle 10 was added to the count each of the partial adders and 20 was added to the count of the total adder. With a large number of sources and denominations a wide variety of partial totals as well as the grand total may be obtained depending upon requirements.

The second half of the cycle operation of the system shown in Fig. 4 is determined by time delay, lock out and reset control unit 4—13. At the end of the scanning cycle a pulse is sent out from the last scanner in the scanner chain. In this case the pulse appears at the output of scanner 4—10 and is applied over leads 4—41 and 4—42 to time delay unit 4—13. This pulse is delayed in unit 4—13 for a predetermined period of time. This unit 4—13 includes a lock out circuit over leads 4—43 and 4—44 to sources 4—1 through 4—6 over branch circuits 4—45 through 4—56 which operates to prevent operation of any of the sources during the scanning cycle. When the pulse from the last scanner is received by unit 4—13, this lock out is removed permitting further operating of the sources. The sources are also reset so that the operations which have been counted will not be counted again. When the pulse has been delayed long enough to permit resetting and further operations of the sources, it is utilized to again set the lock out and to send a pulse to the input of the first scanner 4—7 over leads 4—59 and 4—58 to initiate another scanning cycle. Thus the cycle of operation has been completed and a new scanning cycle is started. In general, the scanning portion of the complete cycle is so short that the system is apparently in condition for operation of any of the sources at all times.

Figure 5:
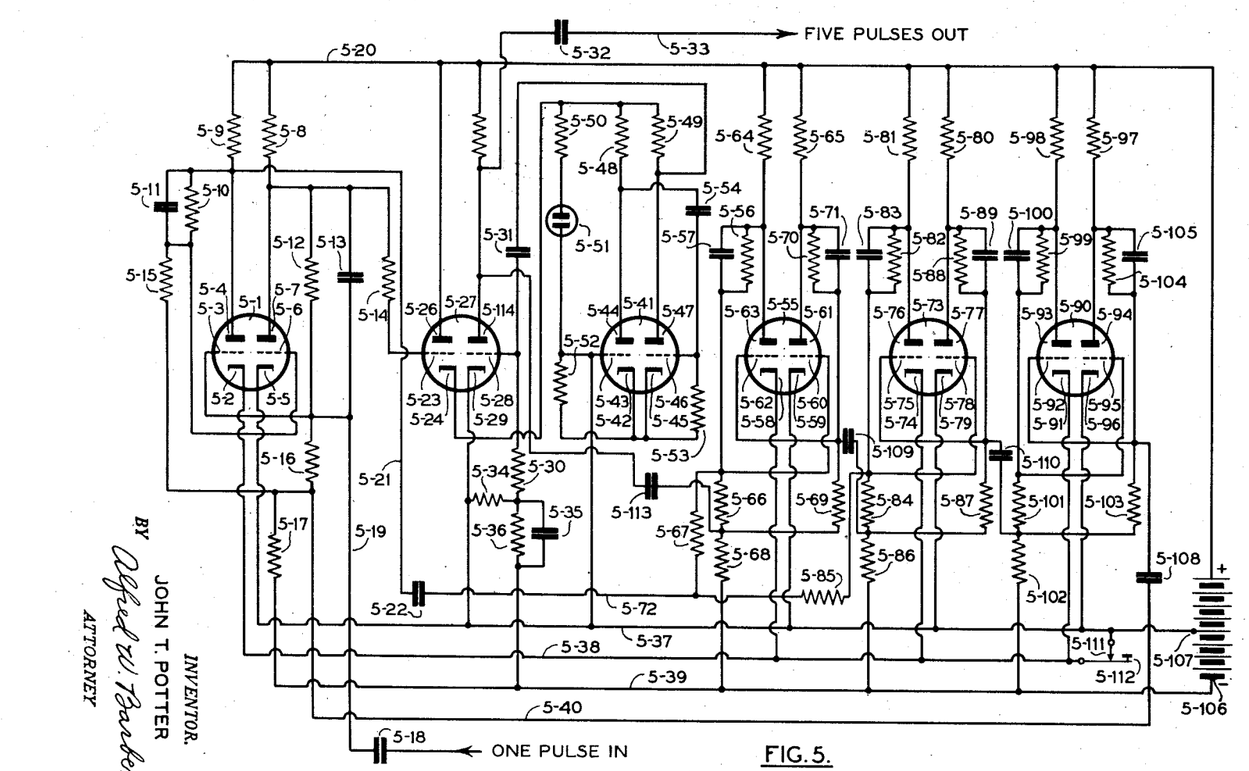

Fig. 5 shows the complete circuit of a pulse generator suitable for use in the combinations of the present invention. The pulse generator shown includes a switching tube 5—1, a buffer tube 5—27, an oscillator tube 5—41 and a three-tube predetermined counter made up of tubes 5—55, 5—73 and 5—90. The purpose of this pulse generator is to issue a predetermined number of pulses for each pulse received. In the particular circuit shown five pulses are generated for each input pulse. Briefly, the input pulse operates switch tube 5—1 which turns on the oscillator tube 5—41 and presets a count of three in the predetermined counter. The predetermined counter has three stages normally counting eight and, hence, when preset to three, counts the balance or five. At the count of five pulses from the oscillator the counter sends out a pulse which turns the switch tube off, stopping the oscillator. The five pulses from the oscillator are passed to the output for utilization.

Switch tube 5—1 is a double triode with cathodes 5—2 and 5—5 heated by conventional means not shown, control grids 5—3 and 5—6 and plates 5—4 and 5—7. Plates 5—4 and 5—7 are energized from a suitable source such as battery 5—106 over lead 5—20 and through load resistors 5—9 and 5—8 respectively. Plate 5—4 is connected to the negative end of battery 5—106 through resistors 5—10, 5—15 and 5—17 all in series. Plate 5—7 is connected to the negative end of battery 5—106 through resistors 5—12, 5—16 and 5—17 all in series. Typical resistor values are 5—9 and 5—8 equal to 39,000 ohms each, 5—10 and 5—12 equal to 100,000 ohms each, 5—15 and 5—16 equal to 47,000 ohms each and 5—17 equal to 100,000 ohms. Resistor 5—10 is shunted by capacitor 5—11 and resistor 5—12 by capacitor 5—13 each having a value of the order of 500 micro-microfarads. Grid 5—6 is connected to the point where resistor 5—10 joins resistor 5—15 and grid 5—3 is connected to the common point of resistors 5—12 and 5—16. This switch or flip-flop circuit can assume two conditions. In one condition plate 5—4 draws substantial current and plate 5—7 is substantially cut-off. The second condition results when plate 5—7 draws substantial current and plate 5—4 is cut-off. Capacitors 5—11 and 5—13 together with the resistors cause the current to shift from whichever plate it is flowing in to the other plate upon receipt of an actuating pulse. Initially plate 5—7 draws current, depressing its voltage due to the plate current voltage drop in plate resistor 5—8. Upon receipt of an input pulse through coupling capacitor 5—18 over lead 5—19 to the junction between resistors 5—12 and 5—16 the current is shifted to plate 5—4 and the voltage of plate 5—7 rises. This energizes oscillator 5—41, as will be described in detail below, and starts the generation of pulses. When the required number of pulses has been generated, a pulse from the counter over lead 5—40 across resistor 5—17 turns the switch tube back to its intial condition and stops the oscillator.

The oscillator is not limited to the form shown but the R.-C. oscillator shown is particularly suitable since its amplitude may be suddenly changed without generating transients. Oscillator tube 5—41 is a double triode including cathodes 5—42 and 5—45 heated by conventional means not shown, control grids 5—43 and 5—46, and plates 5—44 and 5—47. Plate 5—44 is connected to load resistor 5—48 and plate 5—47 to load resistor 5—49. Cathodes 5—45 and 5—42 are connected together and through the common cathode resistor 5—52 to point 5—107 on plate supply battery 5—106. Plate 5—44 is connected to grid 5—46 by means of phase control capacitor 5—54 and grid 5—46 is connected to cathode 5—45 through resistor 5—53. Resistor 5—50 in series with neon lamp 5—51 is connected from the plate voltage supply point to the cathode return point, so that the neon lamp lights whenever the oscillator is energized. While the oscillator frequency may be chosen to suit a particular application, the circuit herein being described is designed to oscillate at about 1000 cycles. This frequency is obtained with resistor 5—48 equal to 39,000 ohms, resistor 5—49 equal to 39,000 ohms, resistor 5—52 equal to 2200 ohms, resistor 5—53 equal to 100,000 ohms and capacitor 5—54 equal to 1000 micro-microfarads. Glow lamp 5—51 in series with resistor 5—50 connected between grid 5—43 and cathode 5—24 will give an indication when the oscillator is in operation.

The oscillator is turned on by the input pulse. A predetermined counter comprising tubes 5—55, 5—73 and 5—90 is set to count the desired number of pulses from the oscillator, in this case five, and then turns the oscillator off. The predetermined counters comprising tubes 5—55, 5—73 and 5—90 is connected to form a binary counter. The first counter stage includes the double triode vacuum tube 5—55 having plates 5—63 and 5—61, control grids 5—62 and 5—60, and cathodes 5—58 and 5—59 the latter being heated by conventional means not shown. Plates 5—63 and 5—61 are connected through resistors 5—64 and 5—65 to the positive side of battery 5—106 and through resistors 5—56 and 5—70 shunted by condensers 5—57 and 5—71 to grids 5—60 and 5—62 respectively. Grids 5—60 and 5—62 are returned through grid resistors 5—66 and 5—69 and common grid resistor 5—68 to the negative end of plate supply battery 5—106. The second stage of the counter is similar to the first, employing double triode 5—73 with plates 5—76 and 5—77, control grids 5—75 and 5—78, and cathodes 5—74 and 5—79. This stage is connected as was the first stage, utilizing plate resistors 5—81 and 5—80, plate to grid circuit resistors 5—82 and 5—88 shunted by condensers 5—83 and 5—89, grid resistors 5—84 and 5—87 and common grid resistor 5—86. The third stage, comprising double triode 5—90 having plates 5—93 and 5—94, control grids 5—92 and 5—95, and cathodes 5—91 and 5—96, is similarly connected to circuit elements including plate resistors 5—98 and 5—97, plate to grid circuit resistors 5—99 and 5—104 shunted by condensers 5—100 and 5—105, grid resistors 5—101 and 5—103 and common grid resistor 5—102. Stage one of the counter is connected to stage two by means of coupling condenser 5—109 connected between grid 5—62 and the high side of the second stage common grid resistor 5—86. Similarly stage two is coupled to stage three by means of coupling condenser 5—110 connected between grid 5—75 and the high side of the third stage common grid resistor 5—102. Thus, connected, this three stage binary counter would normally count two in the first stage, four in the second stage and a total of eight in the third stage. Hence, if the oscillator output is fed through coupling condenser 5—113 into stage one of the counter, one pulse will be applied to output coupling condenser 5—108 when the eighth oscillator pulse is received and counted. However, it is desired to count to five and this is accomplished by coupling the switching tube 5—1 to grid 5—78 through branch resistor 5—85 and to grid 5—60 through resistor 5—67, so that a count of three is preset by the actuating pulse causing it to count the remainder of the count of eight or the desired count of five. At the count of five the output pulse of the counter passes through coupling condenser 5—108 to the high side of the common grid resistor 5—17 of the electronic switch tube 5—1, turning the switch to the off position and stopping oscillator 5—41. The buffer tube 5—27 serves two functions. Its left side elements 5—23, 5—24 and 5—26 responding to the switching tube 5—1 gates plate voltage to oscillator tube 5—41 to turn the oscillator on or off. Its right side elements 5—28, 5—29 and 5—144 form a buffer amplifier for the oscillator output feeding both the counter and the output of the pulse generator itself through condensers 5—133 and 5—32 respectively. This circuit that has just been described, therefore, generates an output consisting of five pulses at condenser 5—32 for each single input pulse received through input condenser 5—18. The initial condition of the electronic switch and counter stages may be reset by pressing reset button 5—112 opening contact 5—111 thereby establishing the left side of these circuits as the minimum current side.

The pulse generator which has been shown in Fig. 5 and above described may evidently be used wherever pulse generators are designated in the other figures of the drawing. Any desired number of pulses may be generated for each input pulse merely by setting the predetermined counter to the proper count. The predetermined counter may have only one stage in which case it will count two providing a two pulse generator. Two stages will count three by presetting a count of one and will count four without modification. A three stage counter will count up to eight and a four stage counter will count up to sixteen. Ten pulse generators or any multiple of ten may be constructed utilizing decade counters, that is, binary counters modified to count ten.

To summarize the operation of the pulse generator the actuating pulse flips an electronic switch which turns on an oscillator through the medium of a cathode follower stage. A predetermined counter counts the oscillator pulses which are fed to the output and at a predetermined count flips the electronic switch in the opposite direction turning the oscillator off.

Figure 6:
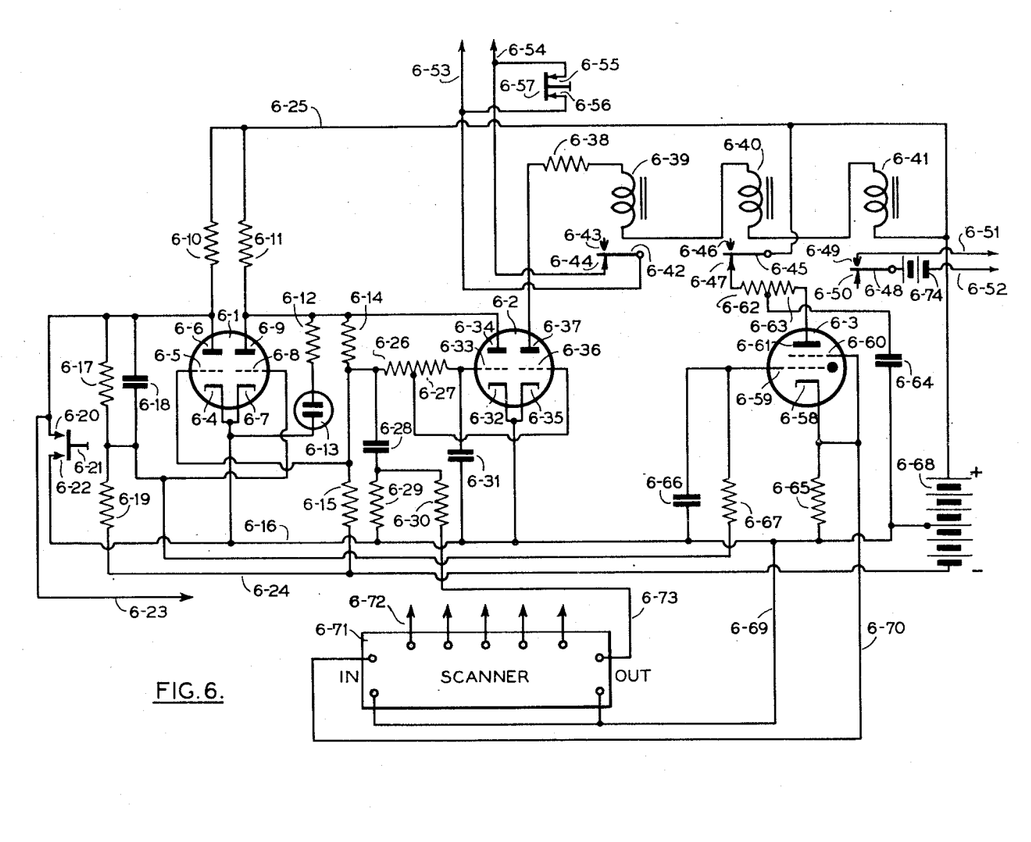

Fig. 6 shows a circuit of one form of Time Delay, Lock Out and Reset Control according to the present invention. This unit receives an actuating pulse from the output of the last scanner stage in the system. This pulse is delayed while various relays or other electro-mechanical devices are operated directly or indirectly from this unit. When all the relay and resetting functions have been performed, a pulse is initiated and fed to the input of the first scanner stage for initiating a new scanning cycle.

Fig. 6 shows in detail an electronic switch tube 6—1, coupling and control tube 6—2 and thyratron tube 6—3. Electronic switch tube 6—1 includes cathode 6—4 heated by conventional means not shown, control grid 6—5 and plate 6—6 forming one triode, and cathode 6—7 heated by conventional means not shown, control grid 6—8 and plate 6—9 forming a second triode. These two triodes are connected to form an electronic switch by connecting plate 6—6 through resistor 6—10 to a source of plate voltage 6—68, and through resistor 6—17 in series with resistor 6—19 to the negative end of voltage source 6—68. Resistor 6—17 is shunted by a capacitor 6—18 and grid 6—8 is connected to the junction between resistors 6—17 and 6—19. Plate 6—9 is connected to the plate voltage source 6—68 through resistor 6—11 and to the negative side of voltage source 6—68 through resistors 6—14 and 6—15 connected in series. Grid 6—5 is connected to the junction between resistors 6—14 and 6—15. Cathodes 6—4 and 6—7 are connected over lead 6—16 to an intermediate point on voltage source 6—68. This switch will be considered off when plate 6—9 is drawing the greater current of the two plates. Neon lamp 6—13 connected through current limiting resistor 6—12 between plate 6—9 and cathode 6—7 will indicate the on condition.

At the completion of a scanning cycle, a pulse will appear at the output of the scanner 6—71 and is applied over lead 6—73, through resistor 6—30 and capacitor 6—28 to grid 6—5. This pulse turns the electronic switch on by transferring the greater plate current flow to plate 6—6 and lights neon 6—13. The pulse from the scanner output is also applied through resistor 6—26 to grid 6—36 of the double triode control tube 6—2. Due to the pulse on grid 6—36, plate 6—37 draws current energizing relay coils 6—39, 6—40 and 6—41 through resistor 6—38 to voltage source 6—68. Cathodes 6—32 and 6—35 of control tube 6—2 are connected to an intermediate point on voltage source 6—68. The energizing of the relay coils pulls armatures 6—42, 6—45 and 6—48 to the "up" position as shown opening contacts 6—44 and 6—47 and closing contact 6—49. The circuit formed from lead 6—53 through contact 6—44 and 6—42 to lead 6—54 may be utilized for any resetting or control purpose to be initiated at the end of the scanning period such as resetting the switches and counters in the pulse generator or generators. One such point would be at 5—112 in Fig. 5. For automatic resetting switch 5—112 and the switch formed by contacts 6—55, 6—56 and 6—57 are left open. The opening of contact 6—47 to 6—45 opens the plate supply circuit of thyratron 6—3 causing it to deionize. The closing of contact 6—49 to 6—48 connects a suitable voltage source such as 6—74 across leads 6—51 and 6—52 which go to any desired point for resetting and/or lock out functions. One example is to connect leads 6—51 and 6—52 to leads 7—13 and 7—14 to operate the resetting and lock out device shown in Fig. 7. During a predetermined interval which may be designated as the "on time" for allowing the various relays in the system to close, the pulse from the scanner is delayed by resistor 6—27 connected to capacitor 6—31. By proper choice of resistor 6—27 and capacitor 6—31 values, the rate at which the voltage across capacitor 6—31 builds up may be controlled. When this voltage reaches a certain point grid 6—33 which is connected to the junction between capacitor 6—31 and resistor 6—27 allows current to flow to plate 6—34 from cathode 6—32. This flow of current to plate 6—34 drops the voltage on plate 6—9 of the electronic switch and causes the switch to go off. This drop in voltage of plate 6—34 also lowers the voltage at grid 6—36 through resistors 6—14 and 6—26, causing the current to plate 6—37 to decrease deenergizing relay coils 6—39, 6—40 and 6—41. Armatures 6—42, 6—45 and 6—48 then drop to their lower positions closing contacts 6—44 and 6—47 and opening contact 6—49. Closing contact 6—47 energizes plate 6—61 of thyratron 6—3 through resistors 6—62 and 6—63 from voltage source 6—68. This places thyratron 6—3 in condition for firing.

The time delay period now to be described may be termed the "off time" since its purpose is to allow the relays and associated devices to deenergize and return to their initial positions The turning off of the electronic switch 6—1 which has been described above initiates the "off time" period. When this switch goes off the voltage of plate 6—6 rises suddenly and the resulting pulse is fed through resistor 6—67 to control grid 6—59 of thyratron 6—3. The time required for grid 6—59 to rise to the ignition point is predetermined by the selection of series resistor 6—67 and shunt capacitor 6—66. This is the time delay period above designated as "off time." When thyratron 6—3 fires, the charge stored in capacitor 6—64 is discharged through resistor 6—63, the thyratron from plate 6—61 to cathode 6—58 and resistor 6—65. The resulting pulse across resistor 6—65 is applied over lead 6—70 to the input to scanner 6—71 and thereby initiates a new scanning cycle.

If, for any reason, it is desired to stop the scanning process contacts 6—20 and 6—22 may be shorted either by button 6—21 or from a remote point over lead 6—23 which drops the voltage on plate 6—6 and prevents the operation of the electronic switch.

Figure 7:
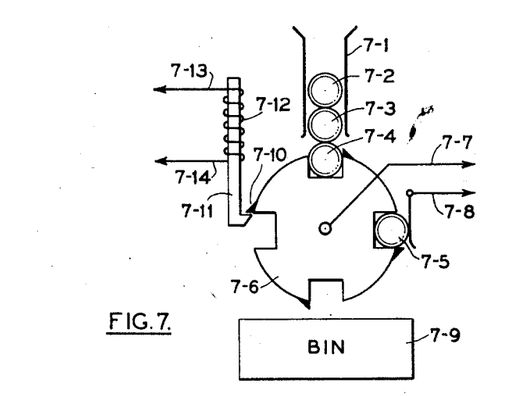

Fig. 7 shows one form of lock out and reset device according to the present invention. While the particular form which the lock out and reset device will assume depends on the particular application involved, the form shown in Fig. 7 is particularly adapted to a coin counting machine. Coins such as 7—2 and 7—3 are fed to the device in a suitable manner as by means of chute 7—1. Slotted disc 7—6 is adapted to rotate one-quarter revolution each time solenoid 7—12 is energized pulling plunger 7—11 upward against projection 7—10 on disc 7—6. Leads 7—13 and 7—14 serve to connect solenoid 7—12 to the time delay, lock out and reset control unit such as 4—13 of Fig. 4. When disc 7—6 is moved upon the energizing of solenoid 7—12, which takes place during the time delay interval previously described, a coin, if present at position 7—4 is moved to position 7—5. At position 7—5 the coin closes the circuit between lead 7—7 and contact 7—8. This circuit is connected to a scanner as described above causing a count to be registered. Plunger 7—11 remains down during the scanning part of the cycle and the stationary position of disc 7—6 effectively locks out coins from reaching the counting postion at 7—5. The operation of plunger 7—11 resets the device by bringing an empty slot in disc 7—6 into position under chute 7—1. At the end of the scanning part of the cycle, the coin which was at position 7—5 for counting is dumped into a suitable receptacle such as bin 7—9. It will be seen that this device performs several functions. It resets upon the operation of plunger 7—11. It locks out coins during the scanning part of the cycle. It does not require synchronous operation since it will count all coins entering chute 7—1 as long as the average rate of counting exceeds the average rate at which coins are received by chute 7—1.

Figure 8:
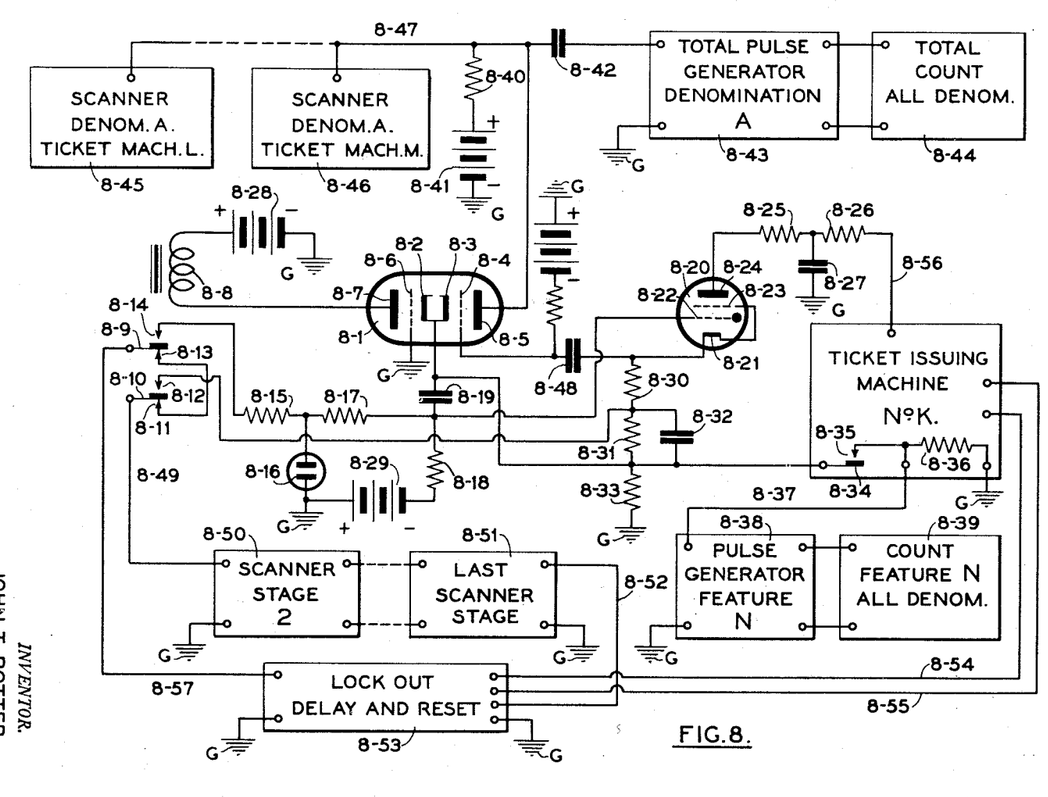

Fig. 8 shows the details of one form of scanner stage used in a totalizing system the remainder of which is shown in block diagram according to the present invention. While only a single denomination is shown it will be understood that a number of denominations may be handled for each feature and that various total and partial counts may be registered as for instance, total count for all features and all denominations and a partial total count for each feature and all denominations. The particular methods of connection will be evident from this and the other figures of the drawing. Fig. 8 shows a typical portion of a totalizing system according to the present invention showing, in particular, the relation between a scanner stage and the remainder of the system. The ticket machines are designated by the letters K, L and M. Each ticket machine issues tickets of one denomination, in this case denomination A. There is a scanner stage for each ticket machine. A more detailed description of Fig. 8 follows.

In Fig. 8 is shown a scanner stage including the two triodes which may be a dual tube as shown at 8—1 with cathodes 8—2 and 8—3 heated by conventional means not shown, control grids 8—6 and 8—4 and plates 8—7 and 8—5 and thyratron 8—20 having cathode 8—21 heated by conventional means not shown, control electrode 8—22, suppresser grid 8—23 and plate 8—24. This scanner stage is associated with the feature N key switch 8—34, 8—35 of ticket issuing machine K. When a ticket is to be issued, key 8—34, 8—35 is closed shunting resistor 8—33 which is connected between cathodes 8—2 and 8—3 and ground and is in series with resistors 8—30 and 8—31 and cathode 8—21 and ground with resistor 8—36. Resistor 8—33 has relatively large resistance and when unshunted keeps tubes 8—1 and 8—20 cut off due to cathode current from cathodes 8—2, 8—3 and 8—21. When key 8—34, 8—35 is closed, shunting resistor 8—33 with resistor 8—36 the bias on cathodes 8—2, 8—3 and 8—21 is lowered, placing tubes 8—1 and 8—20 in condition to respond to the scanning pulse. As has been described in connection with Fig. 6, the scanning cycle is initiated by a pulse from lockout, delay and reset unit 8—53 which passes over lead 8—57 to armature contact 8—9. If key 8—34, 8—35 is open, indicating that no ticket is to be issued, this pulse passes through the normally closed circuit across contacts 8—9, 8—13, 8—11 and 8—10 and over lead 8—49 to the second scanner stage 8—50. If, however, key 8—34, 8—35 is closed the voltage on cathode 8—2 is low, as set forth above, causing current to flow from plate source battery 8—28 through relay coil 8—8 to plate 8—7. Current in relay coil 8—8 attracts armatures 8—9 and 8—10, closing contacts 8—9, 8—14 and 8—10, 8—12 so that the input pulse passes through resistors 8—15 and 8—17 charging condenser 8—19 to provide a very brief time delay interval and on to control electrode 8—22. This pulse on control electrode 8—22 causes thyratron 8—20 to fire discharging condenser 8—27 through the circuit of plate 8—24 and cathode 8—21 to ground including resistors 8—25, 8—30, 8—31, 8—33 and 8—36. This sudden current generates a pulse at cathode 8—21 which is applied through capacitor 8—48 to control grid 8—4, which in turn causes a pulse of plate current to flow from plate voltage source 8—41 through resistor 8—40 to plate 8—5. The resulting pulse across resistor 8—40 is applied to the input of pulse generator 8—43. Pulse generator, as a result generates pulses of denomination A which are passed to total adder 8—44 for counting and adding to the grand total of all features and all denominations. Other scanners of the same denomination such as boxes 8—45 and 8—46 also feed pulses to pulse generator 8—43 over lead 8—47 from other ticket machines. These scanners are connected in series between stage 8—50 and stage 8—51 where dotted connections are shown, so that the entire scanning process is a chain sequence. Since a scanner stage is provided for each ticket machine, they are shown in single blocks 8—45 and 8—46. Thus a corresponding block in the chain would include the first scanner stage shown in detail and ticket machine K. The firing of thyratron 8—20 also generates a pulse across resistor 8—31 which is made somewhat broader than the time of peak current by means of shunt capacitor 8—32. This pulse passes through contacts 8—12, 8—10 and by way of lead 8—49 to the next scanner stage 8—50 in order to continue the scanning sequence. The pulse also appears across resistors 8—33 and 8—36 in parallel and is applied over lead 8—37 to the input of pulse generator 8—38 which generates a number of pulses representing denomination A of ticket machine K which are received by adder 8—39 and added to the total for feature N of all denominations. While they are not shown it will be understood that whatever denominations are to be added to the total count of adder 8—39 are tied in by connecting the output of appropriate pulse generators to adder 8—39 in a manner which will be evident from other figures of the drawing. When thyratron 8—20 fires plate 8—24 will have a relatively low impedance to ground and by connecting it to ticket issuing machine K over lead 8—56 other desired functions may be performed, details of which are not shown, such as releasing a ticket or starting ticket issuing devices. It will be seen that these functions are performed only when the scanner stage operates so that a ticket is issued only if it is counted. Neon lamp 8—16 may be connected from the junction between resistors 8—15 and 8—17 to limit the received pulse to a desired value. Bias source 8—29 supplies normal cut-off bias to control electrode 8—22 through resistor 8—18.

When the last scanner stage 8—51 has functioned completing the scanning sequence its output pulse is fed to lock out, delay and reset 8—53 and operates as shown in detail in connection with Fig. 6. The resetting pulse from unit 8—53 is applied over leads 8—54 and 8—55 to perform any required resetting functions in ticket machine K, details of which are not shown. Lock out functions may also be performed which function to prevent closing key 8—34, 8—35 except during the time when resetting current is flowing over leads 8—54, 8—55 in any convenient manner, details of which are not shown.

It will be readily seen that the combinations of the present invention have many great advantages over system hitherto available. The scanning process, being electronic, may be made extremely fast. Each stage can very readily operate in one milli-second, making possible the sequential operation of 500 or more stages in one-half second. If the lock out, delay and resetting functions consume one-half second the complete cycle is performed in one second. The system thus could register operations from over 500 ticket machines once every second. This is many times as fast as any practical device which has been built for similar purposes utilizing mechanical or electro-mechanical devices such as switches and relays.

While several combinations of the present invention have been shown and described, many modifications will be apparent to those skilled in the art and within the spirit and scope of the invention set forth in particular in the appended claims.

What is claimed is:

1. In a totalizing device, the combination of, a plurality of ticket machine sources of each of a plurality of denominations to be activated, scanning means including at least one thermionic vacuum tube coupled to each of said sources, a plurality of means for connecting the tubes coupled to activated sources in cascade, means for passing an electrical scanning pulse through said cascaded tubes, utilization means responsive to the presence of said scanning pulse in each of said cascaded tubes, a time delay circuit for receiving said scanning pulse at the completion of said scanning to delay said pulse for a predetermined interval of time, and means for initiating another scanning pulse at the end of said interval.

2. In a totalizing device, the combination of, a plurality of ticket machine sources of each of a plurality of denominations to be activated for issuing tickets, scanning means including at least one thermionic vacuum tube coupled to each of said sources, a plurality of means for connecting the tubes coupled to activated sources in cascade, means for passing an electrical scanning pulse through said cascaded tubes, pulse generators for generating pulses representing said denominations responsive to the presence of said scanning pulse in each of said cascaded tubes, counters for counting the pulses from said pulse generators for totalizing denominational values, a time delay circuit for receiving said scanning pulse at the completion of said scanning to delay said pulse for a predetermined interval of time, and means for initiating another scanning pulse at the end of said interval.

3. In a totalizing device, the combination of, a plurality of ticket machine sources to be activated for issuing tickets, scanning means including at least one thermionic vacuum tube coupled to each of said sources, a plurality of means for connecting the tubes coupled to activated sources in cascade, means for passing an electrical scanning pulse through said cascaded tubes, utilization means including counters for totalizing said issued tickets responsive to the presence of said scanning pulse in each of said cascaded tubes, a time delay circuit for receiving said scanning pulse at the completion of said scanning to delay said pulse for a predetermined interval of time, and means for initiating another scanning pulse at the end of said interval.

4. In a totalizing device, the combination of, a plurality of ticket machine sources to be activated for issuing tickets, scanning means including at least one thermionic vacuum tube coupled to each of said sources, a plurality if means for connecting the tubes coupled to activated sources in cascade, means for passing an electrical scanning pulse through said cascaded tubes, utilization means responsive to the presence of said scanning pulse in each of said cascaded tubes, a time delay circuit for receiving said scanning pulse at the completion of said scanning to delay said pulse for a predetermined interval of time, means for initiating another scanning pulse at the end of said interval, and means coupled to said scanning means for preventing the activation of said sources during said scanning.

5. In a totalizing device, the combination of, a plurality of ticket machine sources to be activated for issuing tickets, scanning means including at least one thermionic vacuum tube coupled to each of said sources, a plurality of means for connecting the tubes coupled to activated sources in cascade, means for passing an electrical scanning pulse through said cascaded tubes, utilization means including at least one totalizing device responsive to the presence of said scanning pulse in said cascaded tubes, a time delay circuit for receiving said scanning pulse at the completion of said scanning to delay said pulse for a predetermined interval of time, means for initiating another scanning pulse at the end of said interval, and means coupled to said scanning means for preventing the activation of said sources during said scanning.

JOHN T. POTTER.

REFERENCES CITED

The following references are of record in the file of this patent:

UNITED STATES PATENTS

| Number | Name | Date |
| --- | --- | --- |
| 1,744,771 | Julius | Jan. 28, 1930 |
| 1,799,784 | Donnellan | Apr. 7, 1931 |
| 1,932,014 | Frankford | Oct. 24, 1933 |
| 2,203,707 | Thompson | June 11, 1940 |
| 2,237,132 | Christensen | Apr. 1, 1941 |
| 2,262,152 | Welk | Nov. 11, 1941 |
| 2,332,756 | Robinson | Oct. 26, 1943 |
| 2,345,212 | Nelson | Mar. 28, 1944 |
| 2,398,150 | Mumma et al. | Apr. 9, 1946 |
| 2,401,729 | Goldsmith | June 11, 1946 |
| 2,402,988 | Dickinson | July 2, 1946 |
| 2,403,873 | Mumma | July 9, 1946 |
| 2,422,698 | Miller | June 24, 1947 |
| 2,484,115 | Palmer et al. | Oct. 11, 1949 |

FOREIGN PATENTS

| Number | Country | Date |
| --- | --- | --- |
| 402,083 | Great Britain | Nov. 20, 1933 |